(12) United States Patent
Bernard

(10) Patent No.: US 10,758,081 B2
(45) Date of Patent: Sep. 1, 2020

(54) FONDUE POT ADAPTER RING

(71) Applicant: Dany Bernard, St-Victor (CA)

(72) Inventor: Dany Bernard, St-Victor (CA)

( * ) Notice: Subject to any disclaimer, the term of this patent is extended or adjusted under 35 U.S.C. 154(b) by 122 days.

(21) Appl. No.: 16/223,277

(22) Filed: Dec. 18, 2018

(65) Prior Publication Data

US 2019/0183285 A1 Jun. 20, 2019

(30) Foreign Application Priority Data

Dec. 18, 2017 (GB) .................... 1721226.7

(51) Int. Cl.
*A47J 36/06* (2006.01)
*A47J 37/12* (2006.01)
*A47J 43/18* (2006.01)

(52) U.S. Cl.
CPC .......... *A47J 36/06* (2013.01); *A47J 37/1295* (2013.01); *A47J 43/18* (2013.01)

(58) Field of Classification Search
CPC .. A47J 36/20; A47J 2027/006; A47J 37/1295; A47J 27/18; A47J 36/06; A47J 43/18; A47J 27/04; A47J 27/13
USPC ...................................................... 220/573.1
See application file for complete search history.

(56) References Cited

U.S. PATENT DOCUMENTS

| | | | |
|---|---|---|---|
| 566,226 A | 8/1896 | Reutlinger | |
| 1,290,186 A * | 1/1919 | Held ........................ | A47J 36/20 220/531 |
| 1,470,199 A * | 10/1923 | Small ....................... | A47J 27/13 220/573.5 |
| 1,472,205 A | 10/1923 | Brunner | |
| 1,630,787 A * | 5/1927 | Cullen ..................... | A47J 36/20 99/416 |
| 2,522,152 A * | 9/1950 | Wilson ..................... | A47J 36/20 99/450 |
| 3,981,044 A * | 9/1976 | Luebke .................... | A47J 36/20 220/759 |
| 4,406,218 A * | 9/1983 | Hatakeyama ........... | A47J 37/10 99/340 |
| 4,646,628 A | 3/1987 | Lederman | |
| D296,643 S * | 7/1988 | Mueller ................... | A47J 27/13 D7/361 |
| 5,402,714 A * | 4/1995 | Deneault ................. | A47J 36/20 126/369 |
| 6,732,636 B1 * | 5/2004 | Germano ................. | A47J 36/22 99/403 |
| D702,084 S * | 4/2014 | Matos ...................... | A47J 36/20 D7/409 |
| D752,913 S * | 4/2016 | Taylor ..................... | A47J 36/20 D7/354 |

(Continued)

FOREIGN PATENT DOCUMENTS

| | | |
|---|---|---|
| CN | 103654378 | 3/2014 |
| EP | 2478807 | 7/2012 |

*Primary Examiner* — Shawn M Braden

(57) ABSTRACT

The present invention includes a ring that can be fitted around the top perimeter rim of a pot such as caquelon. That ring is comprised of a plurality of brackets that allow for triangular shaped containers to be hooked onto two possible positions. A first position is when the containers sit at the bottom of the pot, and a second position is when they are held predominantly above the ring so that their perforated structure can drip liquid back into the pot.

10 Claims, 3 Drawing Sheets

(56) References Cited

U.S. PATENT DOCUMENTS

| | | | | |
|---|---|---|---|---|
| 2011/0247504 A1* | 10/2011 | Zangrande | .............. | A47J 43/18 99/357 |
| 2012/0213901 A1* | 8/2012 | Kyris | ...................... | A47J 27/18 426/509 |
| 2012/0291636 A1* | 11/2012 | Von Seidel | ............. | A47J 27/04 99/450 |
| 2015/0101977 A1* | 4/2015 | Germano | ................ | A47J 27/18 210/470 |

* cited by examiner

FONDUE POT ADAPTER RING

CROSS-REFERENCE TO RELATED APPLICATIONS

The present application claims priority to United Kingdom Patent Application serial number GB1721226.7, filed on Dec. 18, 2017 entitled "Fondue set adapter ring", the disclosure of which is hereby incorporated in its entirety at least by reference.

BACKGROUND OF THE INVENTION

1. Field of the Invention

The present invention relates generally to cookware but more particularly to a fondue pot adapter ring.

2. Description of Related Art

As well known in the art, fondue is a type of dish consisting of bite sized food in a hot liquid. For instance, the dish may be a blend of cheeses, wine and seasoning, then cooking in a cookware known as "caquelon". White wine is slightly heated with cornstarch, and then grated cheese is added and stirred until melted. It is often topped off with a bit of kirsch. Once the ingredients are heated up in the caquelon, the various bite sized foods are dipped in by the diners using either a skewer or using a triangular "pie piece" shaped tray of container. Generally speaking caquelons are not very well suited for use with the triangular trays or baskets. Some caquelons have hooks on their periphery so that baskets can be hung but the problem is that the caquelon can be hard to clean because of the various protrusions and recesses necessary to have hooks to hold the baskets. Consequently, there is room for improvement.

BRIEF SUMMARY OF THE INVENTION

In one aspect of the invention, a fondue pot adapter ring is provided, comprising a ring body adapted to be positioned around a top perimeter rim of a pot, the ring body having a plurality of brackets projected inward from the top perimeter rim; each bracket of the plurality of brackets includes a slit operably to receive a triangular shaped basket, wherein the triangular shaped basket includes a stub extending integrally from a bottom portion of the triangular shaped basket and a hook member positioned on a top rear portion of the triangular shaped basket; and, the triangular shaped basket is configured to be positioned in the fondue pot via the fondue pot adapter ring via a first position and a second position, wherein the first position is defined when the stub is inserted into the slit such that the triangular shaped basket is positioned at or above the top perimeter rim of the pot, and the second position is defined when the hook member is inserted into the slit such that the triangular shaped basket is positioned at a bottom of the pot.

In one embodiment, the triangular shaped basket includes a plurality of perforated holes. In one embodiment, the triangular shaped basket includes a handle. In another embodiment, the fondue pot adapter ring is configured to receive a plurality of triangular shaped baskets. In one embodiment, the ring body includes a deformable member running along a perimeter of the ring body, wherein the deformable member is configured to snap back underneath the top perimeter rim of the pot securing the ring body onto the pot. In yet another embodiment, the deformable member is made of a resilient material, such that it may snap back and forth without losing strength and shape. In one embodiment, the pot is a caquelon pot. In one embodiment, the pot is electrically heated. In another embodiment, the ring body includes one or more handles to aid in the installation and removal of the fondue pot adapter ring from the pot so as to facilitate the cleaning of the pot. Removing the adapter ring also makes it easier to clean the ring which can be easily cleaned manually or in a dishwasher In yet another embodiment, the ring body includes a bevel to accommodate various pot diameters.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a fondue pot adapter ring.

Figure 1A:
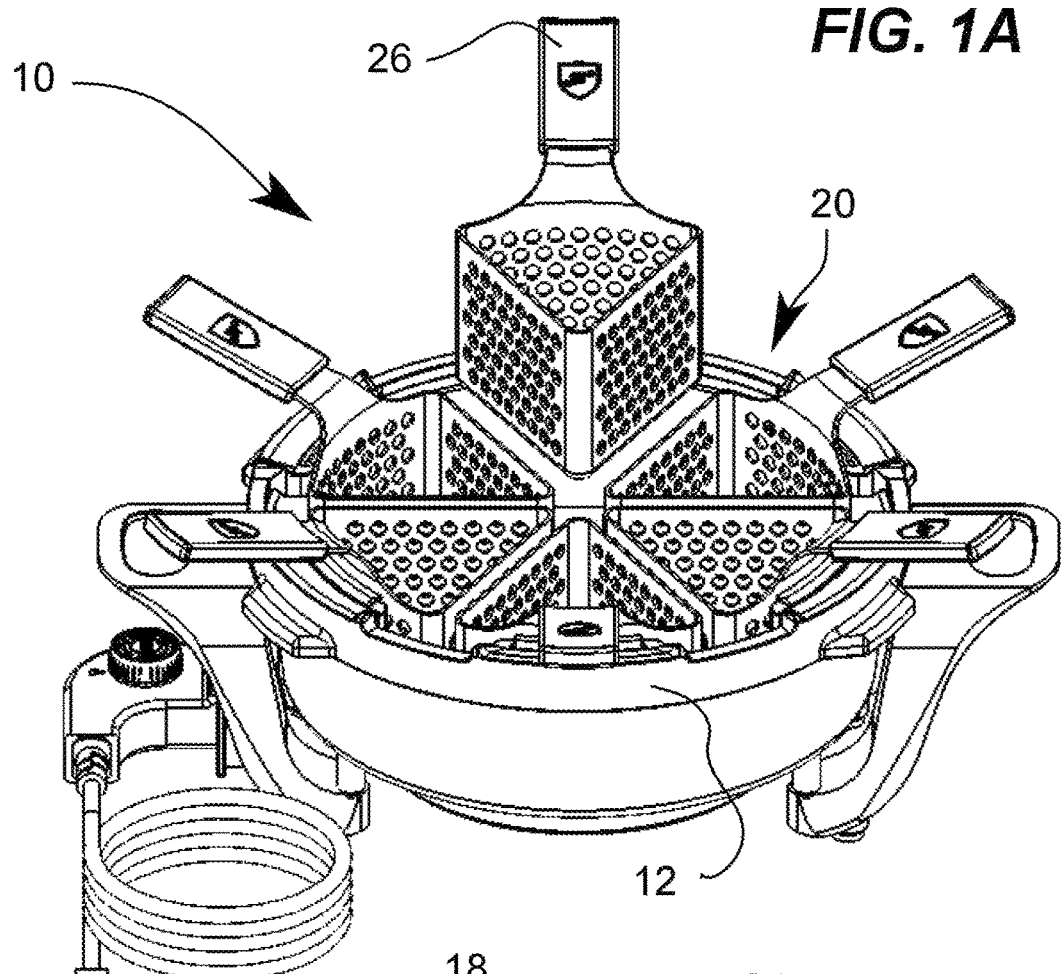
FIGS. 1A-B are isometric views of a fondue pot adapter ring installed on a pot according to an embodiment of the present invention.
Figure 1B:
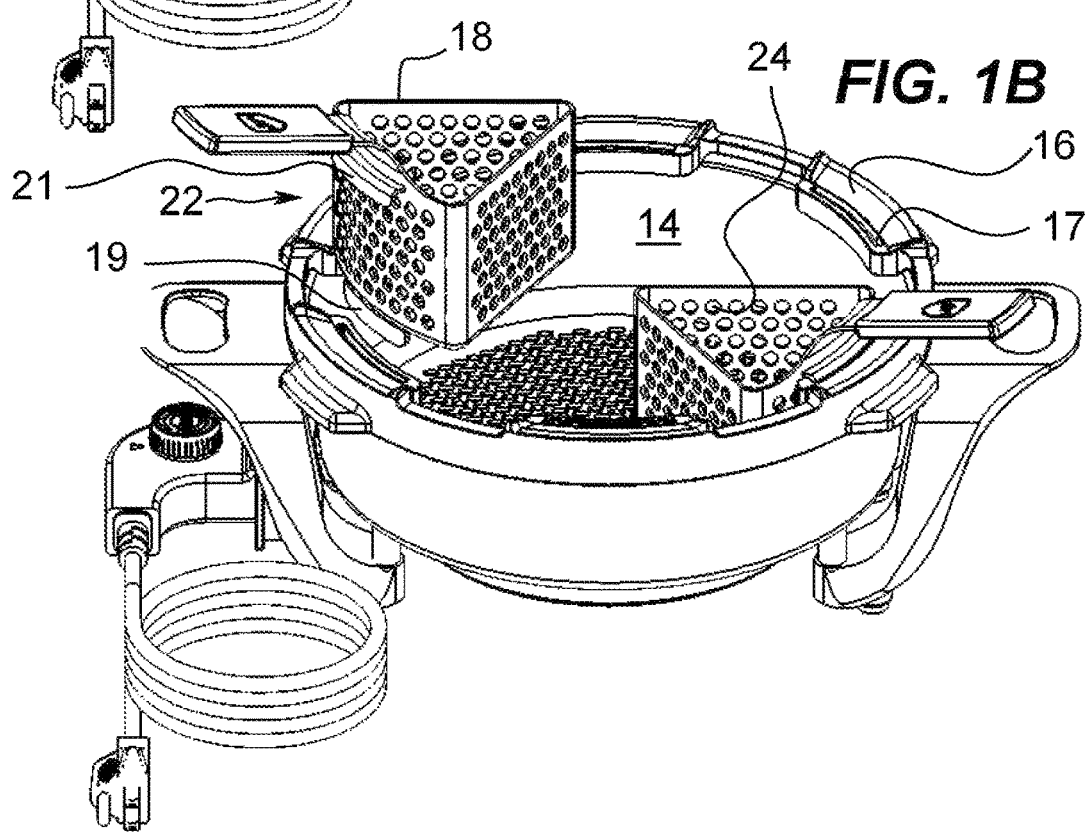
Figure 2A:
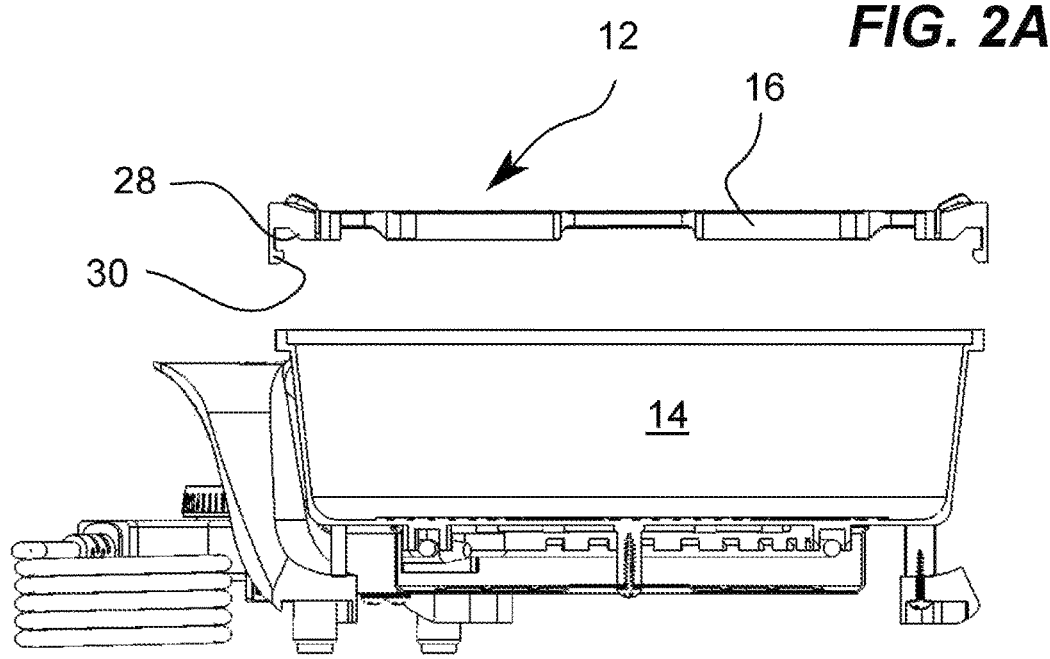
FIGS. 2A-B are cutaway views showing the installation of the adapter ring on the pot according to an embodiment of the present invention.
Figure 2B:
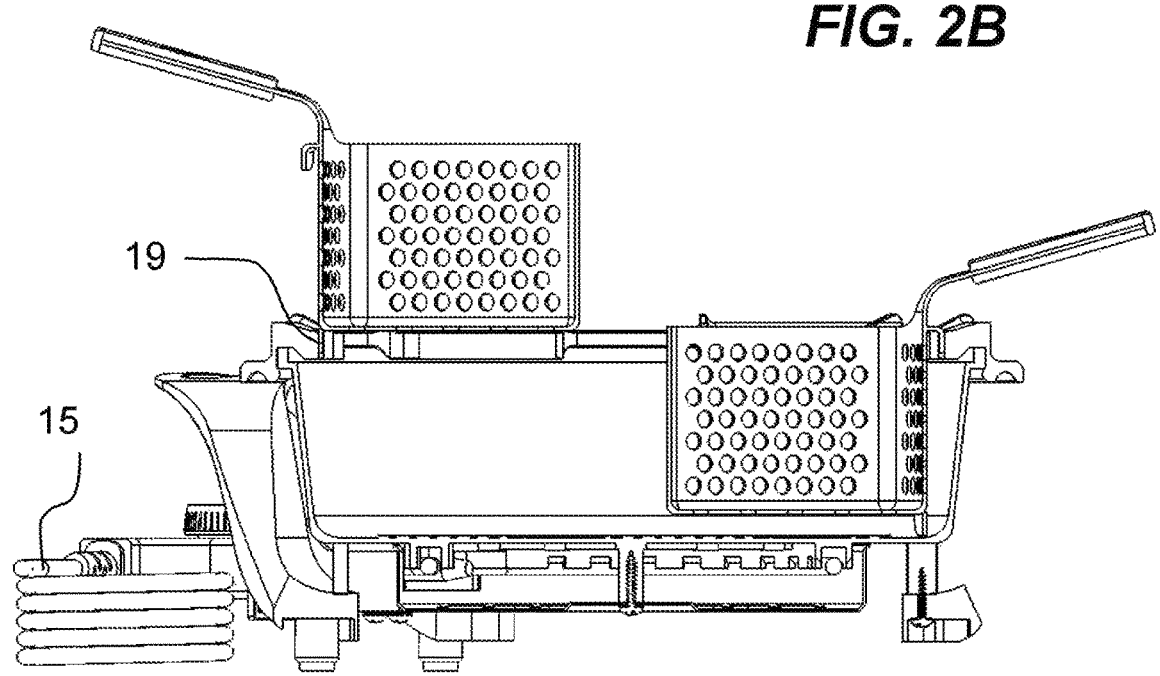
Figure 3:
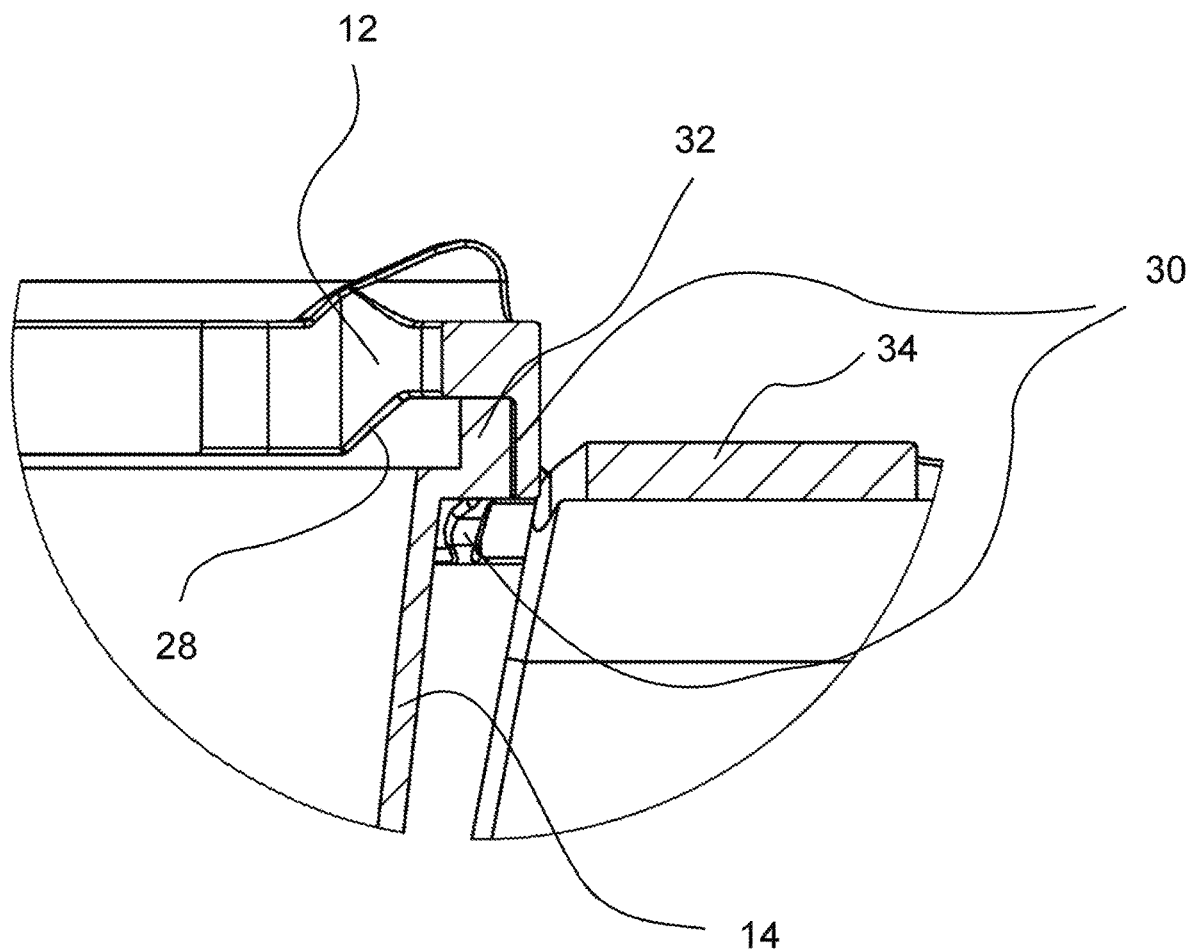
FIG. 3 is a detailed view showing the adapter ring installed on the pot according to an embodiment of the present invention.

Referring to any of the accompanying FIGS. 1-3, a fondue pot adapter ring 10 is illustrated. In one embodiment, the adapter ring comprises a ring shaped body 12 adapted to be positioned around a top perimeter rim section of a pot 14, such as a caquelon or fondue pot. Advantageously, most caquelon pots are available in standard sizes, such as 20 cm or 30 cm in diameter, thus the size of the adapter ring is available and sized to accommodate these standard sizes. In one embodiment, the ring body includes a plurality of brackets 16, wherein the brackets project inward from the perimeter. In one embodiment, the brackets are spaced around the circumference of the body. Each bracket of the plurality of brackets includes a slit 17 operably to receive a triangular shaped basket 18. Specifically, a stub 19 extending integrally from a bottom portion of the basket is configured to be inserted into the slit. This configuration defines a first position 20, when the basket is held above the body. Each basket includes perforated holes around the perimeter and bottom of the basket such that, the first position allows for the liquid contained in the basket to drip back into the pot through the perforated holes.

A second position 22 is when the basket is positioned at the bottom of the pot. In this position, a hook member 21 positioned on the top rear portion of the basket is configured to be inserted into slit 17. The second position is utilized when cooking the bite sized food inside the hot liquid in pot 14. Each basket is equipped with a handle 26 enabling a user to position each basket in either of the two positions. Likewise, the baskets may be removed from the pot entirely when not in use or for cleaning.

In one embodiment, the pot is an electrically heated pot having a power cord 15 supplying electrical power to the heater. The heater has variable temperature settings as well known in the art. Although not ideal, stove-top or other pots may be utilized as well. In most embodiments, the pot is equipped with handles 34 to aid in the transport and movement of the pot. Likewise, body 12 may include handles to aid in the installation and removal from pot 12.

As previously mentioned, most available fondue pots are provided in standard sizes. Thus, in one embodiment, ring 12 includes a bevel 28 (best seen in FIG. 3) on the outer edge of the ring to accommodate minute variations in diameter pot rim sizes due mainly to variances in manufacturing processes between various manufacturers. In one embodiment, the ring includes a deformable member 30 running along the perimeter of the ringed shaped body, wherein the deformable member is configured to snap back underneath pot rim portion 32 securing the ring onto the pot. The deformable member is made of a resilient material, such that it may snap back and forth without losing strength or shape.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For example, the adapter ring can be installed on a proprieatry pot having threads so as to require a twist motion to secure the ring on top of the pot. Other such connection methods can be contemplated.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

What is claimed is:

1. A fondue pot adapter ring comprising:
   a ring body adapted to be positioned around a top perimeter rim of a pot, the ring body having a plurality of brackets projected inward from the top perimeter rim;
   each bracket of the plurality of brackets includes a slit operably to receive a triangular shaped basket, wherein the triangular shaped basket includes a stub extending integrally from a bottom portion of the triangular shaped basket and a hook member positioned on a top rear portion of the triangular shaped basket; and,
   the triangular shaped basket is configured to be positioned in the fondue pot via the fondue pot adapter ring via a first position and a second position, wherein the first position is defined when the stub is inserted into the slit such that the triangular shaped basket is positioned at or above the top perimeter rim of the pot, and the second position is defined when the hook member is inserted into the slit such that the triangular shaped basket is positioned at a bottom of the pot.

2. The fondue pot adapter ring of claim 1, wherein the triangular shaped basket includes a plurality of perforated holes.

3. The fondue pot adapter ring of claim 1, wherein the triangular shaped basket includes a handle.

4. The fondue pot adapter ring of claim 1, wherein the fondue pot adapter ring is configured to receive a plurality of triangular shaped baskets.

5. The fondue pot adapter ring of claim 1, wherein the ring body includes a deformable member running along a perimeter of the ring body, wherein the deformable member is configured to snap back underneath the top perimeter rim of the pot securing the ring body onto the pot.

6. The fondue pot adapter ring of claim 5, wherein the deformable member is made of a resilient material, such that it may snap back and forth without losing strength and shape.

7. The fondue pot adapter ring of claim 1, wherein the pot is a caquelon pot.

8. The fondue pot adapter ring of claim 7, wherein the pot is electrically heated.

9. The fondue pot adapter ring of claim 1, wherein the ring body includes one or more handles to aid in the installation and removal of the fondue pot adapter ring from the pot.

10. The fondue pot adapter ring of claim 1, wherein the ring body includes a bevel to accommodate various pot diameters.

* * * * *